United States Patent
Finn et al.

(10) Patent No.: US 7,652,634 B2
(45) Date of Patent: Jan. 26, 2010

(54) ANTENNA WITH INTEGRATED PARAMETER STORAGE

(75) Inventors: Larry William Finn, Georgetown, TX (US); Christian Alexander Garvin, Round Rock, TX (US); Leo Joseph Gerten, Pflugerville, TX (US)

(73) Assignee: Dell Products L.P., Round Rock, TX (US)

( * ) Notice: Subject to any disclaimer, the term of this patent is extended or adjusted under 35 U.S.C. 154(b) by 185 days.

(21) Appl. No.: 11/217,555

(22) Filed: Sep. 1, 2005

(65) Prior Publication Data

US 2007/0046549 A1    Mar. 1, 2007

(51) Int. Cl.
*H01Q 1/50*    (2006.01)
*G01R 29/08*    (2006.01)

(52) U.S. Cl. ....................... 343/850; 343/894
(58) Field of Classification Search ............. 343/702, 343/850, 852, 860, 853, 858, 894, 703; 340/572.7, 340/572.1

See application file for complete search history.

(56) References Cited

U.S. PATENT DOCUMENTS

| 6,538,606 | B2 | 3/2003 | Quinn et al. |
| 6,667,719 | B2 | 12/2003 | LaKomski |
| 6,778,844 | B2 | 8/2004 | Hood, III |
| 6,879,264 | B2 * | 4/2005 | Hidaka et al. .......... 340/825.19 |
| 7,106,271 | B1 * | 9/2006 | Friday .................. 343/853 |
| 7,113,095 | B2 * | 9/2006 | Kuzma et al. ............ 340/572.7 |

* cited by examiner

*Primary Examiner*—Michael C Wimer
(74) *Attorney, Agent, or Firm*—Haynes and Boone, LLP

(57) ABSTRACT

An antenna identifier is coupled to the antenna. The antenna identifier is a memory device that stores at least one attribute to identify the antenna. The antenna includes an electromagnetic radiation element coupled to a signal port and a coupling device coupled in-between the signal port and the antenna identifier. A data signal received at the signal port is isolated by the coupling device and provided to the antenna identifier. The data signal is provided by a radio device and/or an information handling system (IHS) coupled to the antenna via the signal port. The radio device and/or the IHS is operable to read one or more values for the attribute stored in the antenna identifier.

10 Claims, 3 Drawing Sheets

ANTENNA WITH INTEGRATED PARAMETER STORAGE

BACKGROUND

The present disclosure relates generally to information handling systems, and more particularly to antenna systems used in wireless communications.

As the value and use of information continues to increase, individuals and businesses seek additional ways to acquire, process and store information. One option available to users is information handling systems. An information handling system ('IHS') generally processes, compiles, stores, and/or communicates information or data for business, personal, or other purposes thereby allowing users to take advantage of the value of the information. Because technology and information handling needs and requirements vary between different users or applications, information handling systems may also vary regarding what information is handled, how the information is handled, how much information is processed, stored, or communicated, and how quickly and efficiently the information may be processed, stored, or communicated. The variations in information handling systems allow for information handling systems to be general or configured for a specific user or specific use such as financial transaction processing, airline reservations, enterprise data storage, or global communications. In addition, information handling systems may include a variety of hardware and software components that may be configured to process, store, and communicate information and may include one or more computer systems, data storage systems, and networking systems.

Presently, use of wireless local area networks (LAN's) has experienced rapid growth because wireless technology, when used with portable IHS devices, combines information accessibility with user mobility. Many of these IHS's, especially the portable ones such as notebook computers, personal digital assistants (PDA's), cellular phones and gaming/entertainment devices, typically use various wireless peripheral devices such as radios and wireless network interface cards (NIC's) to communicate between themselves and/or with other wired or wireless networks, including intranets and the Internet. Wireless communication technologies continue to evolve and mature. Currently available wireless communication technologies include: wireless personal area networks (WPAN), wireless local area networks (WLAN), and wireless wide area networks (WWAN).

Multiple technological standards may be adopted for use in wireless communication networks. For example, IEEE 802.11, Bluetooth, Global System for Mobile Communications (GSM), and Infrared Data Association (IrDA) are widely accepted standards for wireless communications. Regardless of the standard used, wireless devices typically operate in certain predefined frequency spectrum.

Each radio device within a wireless communication system typically includes one or more antenna's to receive and/or transmit signals. The particular types of antennas or antenna systems deployed within an IHS are customized for each wireless application and are generally dependent on factors such as the communication standard, frequency range, data throughput, distance, power level, minimum quality of service (QOS) criteria and similar others.

Build-to-order manufacturing, assembly and testing of one or more types of antennas coupled to radios within an IHS may be difficult and time consuming. A plurality of radio devices within an IHS may be coupled to a plurality of antennas, with each radio device and each antenna having associated parameters, attributes or properties such as an output power level and a peak gain setting respectively. Testing of wireless functionality includes verification that an output power level of a radio device combined with the peak gain settings for the attached antenna(s) may not exceed applicable regulatory standards. Presently, no tools and/or techniques exist to verify compatibility between radios and antennas during manufacturing, assembly and testing. As a result, many factory or default settings for radios and/or antenna systems may be mismatched and hence, be less than optimal.

Therefore, a need exists to provide for automatically identifying antenna systems coupled to a radio device. Additionally, a need exists to assemble and test radio devices with compatible antenna systems preferably without manual intervention for verification. Accordingly, it would be desirable to provide for automatically identifying an antenna coupled to a radio device of an information handling system absent the disadvantages discussed above.

SUMMARY

The foregoing need is addressed by the teachings of the present disclosure. According to one embodiment, an antenna includes an electromagnetic radiation element coupled to a signal port, an antenna identifier to identify the antenna, and a coupling device coupled in-between the signal port and the antenna identifier, wherein the coupling device isolates a data signal received at the signal port and provides the data signal to the antenna identifier.

In one embodiment, a method for identifying an antenna includes providing an antenna identifier device. At least one attribute identifying the antenna is stored within the antenna identifier device. A radio device coupled to the antenna reads the attribute from the antenna identifier device to identify the antenna.

Several advantages are achieved according to the illustrative embodiments presented herein. The embodiments advantageously provide for an improved technique to automatically identify antennas. A plurality of antennas may be coupled to a corresponding antenna identifier, which stores antenna specific information. A radio device may read the antenna specific information to automatically determine characteristics of the antenna such as frequency band and peak gain. Potential incompatibilities between the radio device and each one of the plurality of antennas may be automatically detected and identified. In addition, factory settings or default values may be automatically modified in response to identifying an antenna type, and testing for compliance with regulatory standards may be performed under optimum power and gain conditions. Thus, manufacturing, assembly and testing of radio devices coupled to antenna systems is performed automatically, without manual intervention for verification.

DETAILED DESCRIPTION

Figure 1:
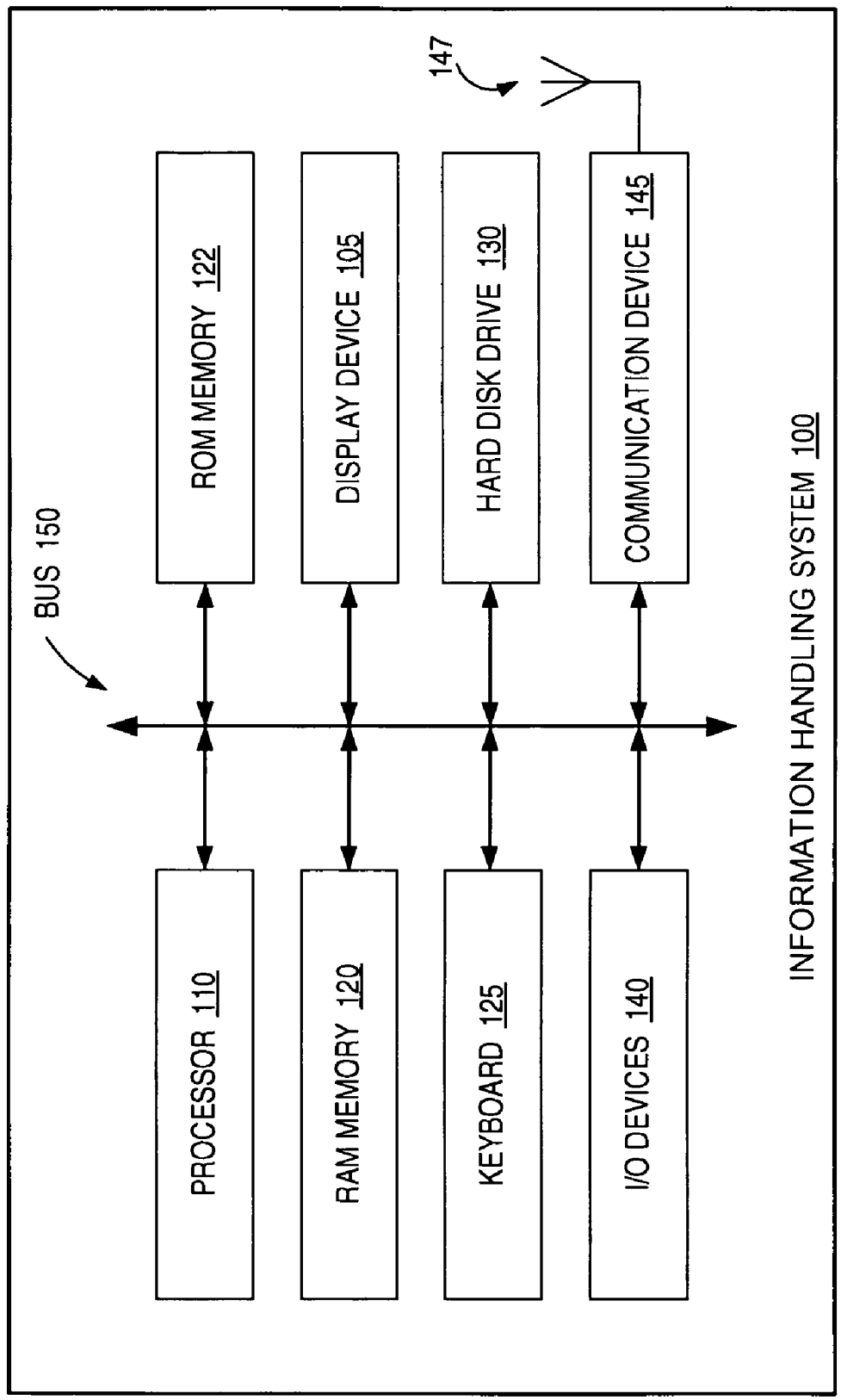
FIG. 1 illustrates a block diagram of an information handling system 100 having an improved antenna, according to an embodiment.

Novel features believed characteristic of the present disclosure are set forth in the appended claims. The disclosure itself, however, as well as a preferred mode of use, various objectives and advantages thereof, will best be understood by reference to the following detailed description of an illustrative embodiment when read in conjunction with the accompanying drawings. The functionality of various circuits, devices, boards, cards, and/or components described herein may be implemented as hardware (including discrete components, integrated circuits and systems-on-a-chip 'SOC'), firmware (including application specific integrated circuits and programmable chips) and/or software or a combination thereof, depending on the application requirements.

A plurality of radio devices within an IHS may be coupled to a plurality of antennas, with each radio device and each antenna having associated parameters, attributes or properties such as an output power level and a peak gain setting respectively. Presently, no tools and/or techniques exist to verify compatibility between various combinations of radios and antennas during manufacturing, assembly, testing, and field use of the IHS. As a result, many factory or default settings for radios and/or antenna systems may be mismatched often resulting in impaired performance. Thus, there is a need for an automatic technique to identify antennas and determine compatibility between various radio and antenna systems.

According to one embodiment, an antenna, an antenna identifier is coupled to the antenna. The antenna identifier is a memory device that stores at least one attribute to identify the antenna. The antenna includes an electromagnetic radiation element coupled to a signal port and a coupling device coupled in-between the signal port and the antenna identifier. A data signal received at the signal port is isolated by the coupling device and is provided to the antenna identifier. The data signal is provided by a radio device and/or an information handling system (IHS) coupled to the antenna via the signal port. The radio device and/or the IHS is operable to read one or more values for the attribute stored in the antenna identifier.

For purposes of this disclosure, an IHS may include any instrumentality or aggregate of instrumentalities operable to compute, classify, process, transmit, receive, retrieve, originate, switch, store, display, manifest, detect, record, reproduce, handle, or utilize any form of information, intelligence, or data for business, scientific, control, or other purposes. For example, the IHS may be a personal computer, including notebook computers, personal digital assistants, cellular phones, gaming consoles, a network storage device, or any other suitable device and may vary in size, shape, performance, functionality, and price. The information handling system may include random access memory (RAM), one or more processing resources such as central processing unit (CPU) or hardware or software control logic, ROM, and/or other types of nonvolatile memory. Additional components of the information handling system may include one or more disk drives, one or more network ports for communicating with external devices as well as various input and output (I/O) devices, such as a keyboard, a mouse, and a video display. The information handling system may also include one or more buses operable to transmit communications between the various hardware components.

FIG. 1 illustrates a block diagram of an information handling system 100 having an improved antenna, according to an embodiment. The information handling system 100 having the improved antenna (not shown) includes a processor 110, a system random access memory (RAM) 120 (also referred to as main memory), a non-volatile ROM 122 memory, a display device 105, a keyboard 125 and an I/O controller 140 for controlling various other input/output devices. For example, the I/O controller 140 may include a keyboard controller, a memory storage drive controller and/or the serial I/O controller. It should be understood that the term "information handling system" is intended to encompass any device having a processor that executes instructions from a memory medium.

The IHS 100 is shown to include a hard disk drive 130 connected to the processor 110 although some embodiments may not include the hard disk drive 130. The processor 110 communicates with the system components via a bus 150, which includes data, address and control lines. In one embodiment, the IHS 100 may include multiple instances of the bus 150. A communications device 145, such as a network interface card and/or a radio device, may be connected to the bus 150 to enable wired and/or wireless information exchange between the IHS 100 and other devices (not shown). In the depicted embodiment, an improved antenna 147 may be coupled to the communications device 145, which is coupled to the bus 150. Additional detail of the improved antenna 147 is described with reference to FIG. 2.

The processor 110 is operable to execute the computing instructions and/or operations of the IHS 100. The memory medium, e.g., RAM 120, preferably stores instructions (also known as a "software program") for implementing various embodiments of a method in accordance with the present disclosure. For example, in a particular software program, the processor 110 may direct the communication device 145 to read the improved antenna 147. In various embodiments the instructions and/or software programs may be implemented in various ways, including procedure-based techniques, component-based techniques, and/or object-oriented techniques, among others. Specific examples include assembler, C, XML, C++ objects, Java and Microsoft Foundation Classes (MFC).

Figure 2:
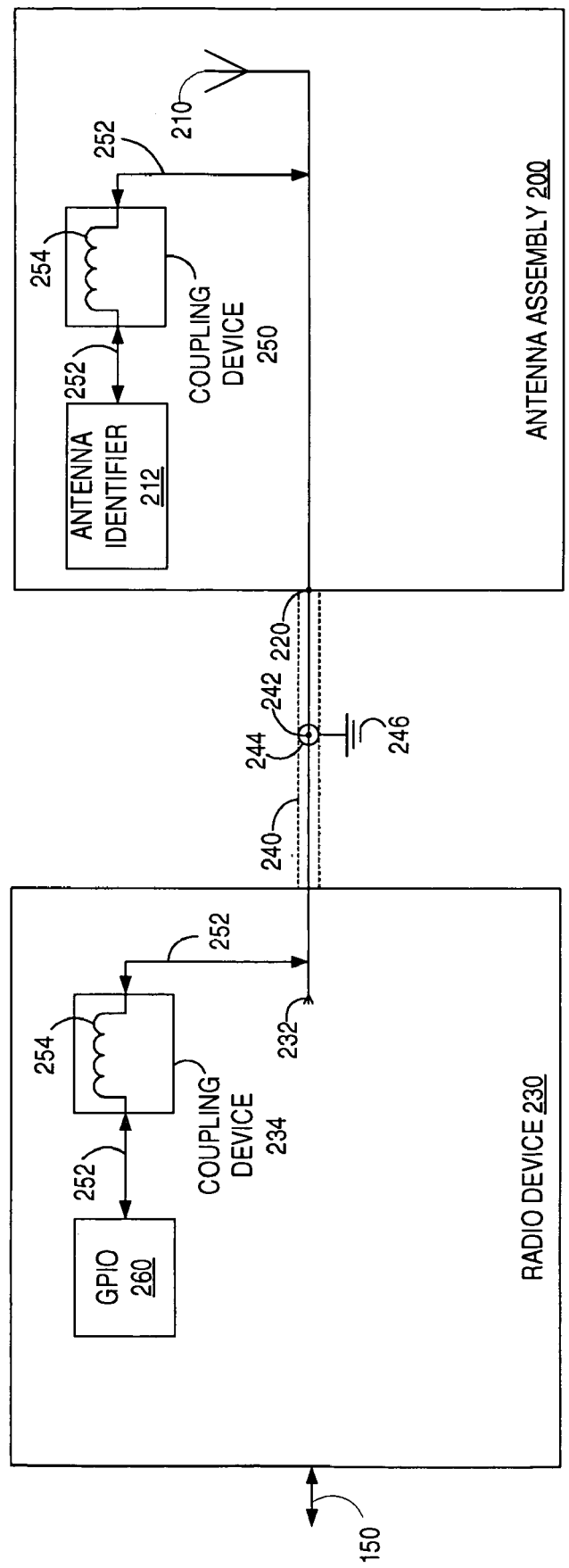
FIG. 2 illustrates a block diagram of an improved antenna coupled to a radio device, according to an embodiment.

FIG. 2 illustrates a block diagram of an improved antenna coupled to a radio device, according to an embodiment. In the depicted embodiment, an antenna assembly 200 includes an electromagnetic radiation element 210 coupled to a signal port 220. A radio device 230 is coupled to the antenna assembly 200 via a radio frequency (RF) cable 240. The radio device 230 provides an RF signal 232 to the signal port 220 via a core conductor 242 of the RF cable 240. A cylindrical conducting sheath 244 of the RF cable 240 is coupled to a ground reference 246. In a particular embodiment, the radio device 230 is substantially the same as the communications device 145 and the antenna assembly 200 is substantially the same as the antenna 147 described in reference to FIG. 1.

The size and shape of the electromagnetic radiation element 210 may vary depending on the wireless application. Typical structure for the electromagnetic radiation element 210 may include stub antenna, dipole antenna, patch antenna, yagi antenna, colinear high gain antenna and similar others. In an exemplary, non-depicted embodiment, the antenna assembly 200 is a multi-frequency band antenna and may include one or more electromagnetic radiation elements corresponding to each frequency band.

In the depicted embodiment, the antenna assembly 200 includes an antenna identifier 212 for identification of the antenna. An antenna may include an identification scheme and/or structure such as a vehicle identification number (VIN) to characterize certain parameters, properties or attributes of the antenna. Information included in the antenna identifier 212 may define values for antenna attributes such as frequency band, peak gain factor, power rating, mounting location, manufacturer name, part number, country of origin, and similar others. Information included in the antenna identifier 212 may be unique to a particular antenna or it may be shared across a class of antennas, e.g., common to a group of antennas operating in the same frequency band.

In an exemplary, non-depicted embodiment, the antenna identifier 212 is a 1-wire memory device operable to store one or more attributes to identify the antenna. A device operable to store information included in the antenna identifier 212 may be described as an antenna identifier device. In this embodiment, because the antenna identifier 212 is a 1-wire device, it may be accessed via the center core conductor 242 of the RF coaxial cable 240. Thus, a digital identification and/or signature of the antenna assembly 200 may be encoded and stored in the antenna identifier 212, and may be read back using existing wiring to identify the characteristics and/or properties of the antenna. In a particular embodiment, information included in the antenna identifier 212 may be stored in a 1024 bit, 1-wire, electrically erasable programmable read only memory (EEPROM) device, e.g., model DS2431 integrated circuit (IC) manufactured by Maxim Integrated Products, Inc., 120 San Gabriel Drive, Sunnyvale, Calif. 94086.

In the depicted embodiment, a coupling device 250 is coupled in-between the signal port 220 and the antenna identifier 212. The coupling device 250 may include one or more of the following components: capacitor, inductor, conductor, switch, and/or any other device which may be used for selective isolation. In a particular embodiment, the coupling device 250 is a direct current (DC) coupler, which enables DC signals to pass through but blocks radio frequency signals. That is, a data signal 252 received at the signal port 220 is isolated by the coupling device 250 and provided to the antenna identifier 212. The coupling device 250 blocks the RF signal 232 conducted through the signal port 220 from reaching the antenna identifier 212. In the depicted embodiment, the coupling device 250 is an inductor 254 element.

In the depicted embodiment, the data signal 252 is provided by the radio device 230. Specifically, the radio device 230 includes a general purpose input/output port (GPIO) 260 to provide the data signal 252. The GPIO 260 is coupled to the core conductor 242 by another coupling device 234. Similar to the coupling device 250, the coupling device 234 may include one or more of the following components: capacitor, inductor, conductor, switch, and/or any other device which may be used for selective isolation. In a particular embodiment, the coupling device 234 is a direct current (DC) coupler, which enables DC signals to pass through but isolates radio frequency signals. That is, the coupling device 234 allows the data signal 252 to pass through to the core conductor 242. However, the coupling device 234 blocks the RF signal 232 from reaching the GPIO 260. In the depicted embodiment, the coupling device 234 is the inductor 254 element. In a particular embodiment, the data signal 252 is a digital signal having a binary voltage level and the RF signal 232 is a radio frequency analog signal. In a particular embodiment, the antenna identifier 212 is powered by the data signal 252. In an exemplary, non-depicted embodiment, the data signal 252 may be generated by a different source such as another GPIO of the IHS 100 or similar other. A communications link between the antenna identifier 212 and the radio device 230 and/or the IHS 100, which uses the core conductor 242, may be unidirectional or bidirectional, and asynchronous or synchronous.

Availability of antenna specific information without additional cabling may be advantageously used to determine compatibility and improve co-ordination between various wireless components, thereby improving efficiency, performance and increasing reliability and safety of the IHS 100. For example, the radio device 230 reads data stored in the antenna identifier 212 to read its peak gain values. The radio device 230 may then dynamically and automatically set its output power levels, e.g., change factory settings or default settings, to match the characteristics of the antenna assembly 200. This will enable the radio/antenna system to maximize the total output power while maintaining compliance with the legal effective isotropically radiated power (EIRP) values, enabling improved wireless performance. As another example, the ability of the radio device 230 to read data from the antenna assembly 200 also enables the IHS 100 system to perform self-diagnostics during factory assembly. The radio device 230 may now advantageously determine whether or not an antenna is properly attached (or even if the correct antenna is attached), thereby reducing the need to perform over the air diagnostic testing in an electrically noisy factory environment.

Figure 3:
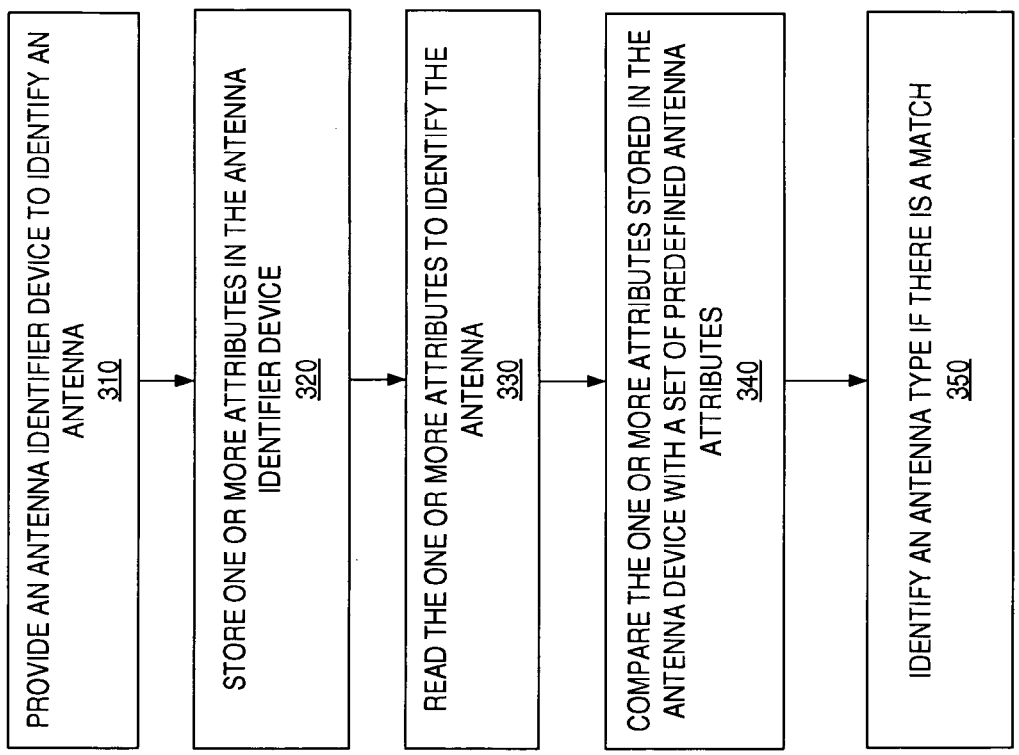
FIG. 3 is a flow chart illustrating a method for identifying an antenna, according to an embodiment.

FIG. 3 is a flow chart illustrating a method for identifying an antenna, according to an embodiment. In step 310, an antenna identifier device is provided to identify an antenna. In a particular embodiment, the antenna identifier device is the 1-wire EEPROM device coupled to the antenna. In step 320, one or more attributes or properties associated with the antenna are stored in the antenna identifier device. In a particular embodiment, a non-volatile memory such as the EEPROM is used for the storage of the attribute information. In step 330, a radio device coupled to the antenna reads the data values for the one or more attributes stored in the antenna identifier device. Various steps described above may be added, omitted, combined, altered, or performed in different orders. For example an additional step 340 may be performed after step 330 to compare identification information stored in the antenna identifier device with a set of predefined antenna attributes. In step 350, an antenna type for the antenna may be identified if the identification information matches at least one of the set of predefined antenna attributes. In a particular embodiment, identification information stored in the antenna identifier device may be sufficient to determine the antenna type without performing the comparison.

Although illustrative embodiments have been shown and described, a wide range of modification, change and substitution is contemplated in the foregoing disclosure and in some instances, some features of the embodiments may be employed without a corresponding use of other features. Those of ordinary skill in the art will appreciate that the hardware and methods illustrated herein may vary depending on the implementation. For example, it should be understood that while the antenna identifier is implemented using a portable IHS system, it would be within the spirit and scope of the invention to encompass an embodiment using any form of an IHS system deploying any wireless technology.

The methods and systems described herein provide for an adaptable implementation. Although certain embodiments have been described using specific examples, it will be apparent to those skilled in the art that this disclosure is not limited to these few examples. The benefits, advantages, solutions to problems, and any element(s) that may cause any benefit, advantage, or solution to occur or become more pronounced are not to be construed as a critical, required, or an essential feature or element of the present disclosure.

The above disclosed subject matter is to be considered illustrative, and not restrictive, and the appended claims are intended to cover all such modifications, enhancements, and other embodiments which fall within the true spirit and scope of the present disclosure. Thus, to the maximum extent allowed by law, the scope of the present disclosure is to be determined by the broadest permissible interpretation of the following claims and their equivalents, and shall not be restricted or limited by the foregoing detailed description.

What is claimed is:

1. An apparatus including:
an antenna assembly comprising:
- an electromagnetic radiation element coupled to a signal port;
- an antenna identifier including a memory device that stores at least one attribute to identify the antenna assembly; and
- a coupling device coupled in-between the signal port and the antenna identifier, wherein the coupling device isolates a data signal received at the signal port and provides the data signal to the antenna identifier, the data signal being provided by a radio device, wherein the radio device is electrically coupled to the electromagnetic radiation element by a radio frequency (RF) cable, the RF cable conducting an RF signal generated by the radio device to the signal port and the radio device reading data stored in the antenna identifier to determine compatibility.

2. The apparatus of claim 1, wherein the antenna identifier is a 1-wire memory device operable to store the at least one attribute to identify the antenna.

3. The apparatus of claim 2, wherein the at least one attribute is a peak gain value.

4. The apparatus of claim 2, wherein the at least one attribute is a frequency band of operation.

5. The apparatus of claim 2, wherein the memory device is an electrically erasable programmable read only memory (EEPROM) device.

6. The apparatus of claim 1, wherein the coupling device isolates the antenna identifier from receiving the RF signal.

7. The apparatus of claim 1, wherein the RF cable is a co-axial cable having a core conductor for conducting the RF signal and a cylindrical conducting sheath coupled to a ground reference.

8. The apparatus of claim 7, wherein the radio device includes a general purpose input/output port (GPIO) to provide the data signal, wherein the GPIO is coupled to the core conductor by another coupling device, wherein the another coupling device isolates the GPIO from receiving the RF signal.

9. The apparatus of claim 1, wherein the antenna identifier is powered by the data signal.

10. The apparatus of claim 1, wherein the data signal is provided by an information handling system (IHS) coupled to the signal port.

* * * * *